United States Patent
Cocker et al.

(10) Patent No.: US 12,081,450 B2
(45) Date of Patent: Sep. 3, 2024

(54) SYSTEM AND METHOD USING IMPROVED MESSAGE QUEUE AND PACKING SCHEME FOR ELECTRONIC DEVICE

(71) Applicant: Palo Alto Research Center Incorporated, Palo Alto, CA (US)

(72) Inventors: Eric D. Cocker, Redwood City, CA (US); Matthew A. Shreve, Campbell, CA (US); Francisco E. Torres, San Jose, CA (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 17/898,985

(22) Filed: Aug. 30, 2022

(65) Prior Publication Data

US 2024/0073152 A1    Feb. 29, 2024

(51) Int. Cl.
*H04L 47/00* (2022.01)
*G06N 5/022* (2023.01)
(Continued)

(52) U.S. Cl.
CPC ......... *H04L 47/6275* (2013.01); *G06N 5/022* (2013.01); *H04L 43/06* (2013.01); *H04L 47/564* (2013.01); *H04L 69/22* (2013.01)

(58) Field of Classification Search
CPC ....... H04L 1/1848; H04L 47/10; H04L 47/22; H04L 47/193; H04L 47/34; H04L 47/32; H04L 47/31; H04L 47/27; H04L 41/0896; H04L 41/0897; H04L 47/522; H04L 47/622; H04L 47/50; H04L 49/3018; H04L 49/205; H04L 49/90; G06F 12/121;
(Continued)

(56) References Cited

U.S. PATENT DOCUMENTS

| | | | | |
|---|---|---|---|---|
| 8,296,337 B2* | 10/2012 | Flynn | ............... | G06F 11/108 707/819 |
| 2012/0106406 A1* | 5/2012 | Xu | ............... | H04W 28/14 370/280 |

(Continued)

*Primary Examiner* — Gerald A Smarth
(74) *Attorney, Agent, or Firm* — Lippes Mathias LLP (57) ABSTRACT

A system and method provide a combination of a modular message structure, a priority-based message packing scheme, and a data packet queue management system to optimize the information content of a transmitted message in, for example, the Ocean of Things (OoT) environment. The modular message structure starts with a header that provides critical information and reference points for time and location. The rest of the message is composed of modular data packets, each of which has a data ID section that the message decoder uses for reference when reconstructing the message contents, an optional size section that specifies the length of the following data section if it can contain data of variable length, and a data section that can be compressed in a manner unique to that data type. The message packing scheme uses a combination of priority level and minimum reporting interval, both of which are dynamically configurable for each data packet type, to maximize the value of the information contained in the modular data packets included in each message. Finally, the data packet queues manage temporary storage of data packets that have been generated but not yet included in an outgoing message.

24 Claims, 4 Drawing Sheets

(51) Int. Cl.
*H04L 43/06* (2022.01)
*H04L 47/56* (2022.01)
*H04L 47/6275* (2022.01)
*H04L 69/22* (2022.01)

(58) Field of Classification Search
CPC ......... H04W 72/1221; H04W 28/0925; H04W 36/0066; G06N 3/088; G06N 3/08
See application file for complete search history.

(56) References Cited

U.S. PATENT DOCUMENTS

2012/0182870 A1* 7/2012 Francini .................. H04L 47/28
370/235
2021/0409335 A1* 12/2021 Zhu ........................ H04L 47/24

* cited by examiner

| message class | default priority | minimum reporting % |
|---|---|---|
| alerts and acknowledgements | 1000 | n/a |
| mission sensor detections | 8 | n/a |
| GPS traces | 6 | 50 |
| ASI contacts (est) | 6 | n/a |
| hotel sensor data | 5 | 50 |
| mission sensor background data | 4 | n/a |
| AIS contact (simple) | 4 | n/a |
| mission sensor detection alerts | 3 | n/a |
| system status messages | 3 | 100 |
| IMU anomaly traces | 2 | n/a |
| IMU anomaly alerts | 1 | n/a |

FIG. 4

SYSTEM AND METHOD USING IMPROVED MESSAGE QUEUE AND PACKING SCHEME FOR ELECTRONIC DEVICE

STATEMENT REGARDING FEDERALLY SPONSORED RESEARCH OR DEVELOPMENT

This invention was made with U.S. Government support under Contract No. HR00112090101 awarded by DARPA. The United States Government has certain rights in the invention.

TECHNICAL FIELD

The present specification relates to data management and/or transmission. In one example, it relates to data management and/or transmission for floating sensors (or sensor carrying devices or floats) deployed on the open sea. Thus, it finds suitable application in connection with, for example, oceanic sensors and will be described with particular reference thereto. However, it is to be appreciated that the subject matter described herein is equally suited to and/or adapted for other like applications.

BACKGROUND

It has been proposed to deploy inexpensive devices floating on the ocean to detect and report a variety of signals, including images, environmental information and signals generated by human activity and radio communications. For example, one proposed initiative aims to deploy a large fleet of inexpensive floating sensors (referred to herein as floats) that include cameras. One example of such a deployment is referred to as the Ocean of Things (OoT).

As proposed, the collected data including the image data collected by the float's camera is communicated from the float to a desired remote location (i.e., remote relative to the float) via a radio communication and/or wireless telecommunication link, e.g., a wireless link and/or radio communication to a satellite in orbit about the earth. The transmission of this data is generally permitted to employ and/or occupy a limited amount of time, bandwidth and/or other resources of the satellite and/or wireless link over which the transmission is being placed.

In some cases, these devices or floats may be restricted to selectively transmit acquired data with extremely limited data rates (e.g., 340 Bytes/20 minutes); in such cases, it is generally important to transmit only essential information that is relevant to a particular goal or objective. Under such restrictive constraints, it may be infeasible and/or undesirable to rely on traditional data management and transmission techniques for operation of these devices.

BRIEF DESCRIPTION

According to one aspect of the presently described embodiments, a system, for managing data transmission on a transmission link of limited bandwidth relative to an amount of data generated or collected and stored in data packets on the system, comprises at least one processor including a first processor and a second processor wherein the first processor, in combination with sensor devices of the system, controls data collection on the system in an amount or rate that is multiple times an amount or rate that is available for transmission using the transmission link, at least one memory having stored thereon code or instructions that, when executed by the second processor, cause the system to identify data packets stored after a last transmission, identify data packets of data collected or generated after the last transmission; store all identified data packets in a queue, generate a message based on priority levels assigned to each data packet type wherein the identified data packets having minimum reporting frequency requirements are given a highest priority level to be included in the message followed by the identified data packets having a set priority level to be included in the message, wherein the priority levels are configurable, and transmit the message with included data packets to a remote device.

According to another aspect of the presently described embodiments, the transmitted data packets are included in the message having a header including device-critical information and reference points for time and location and each data packet contains at least one data identification section configured such that a message decoder uses the at least one data identification section for reference when reconstructing the message contents, an optional size section configured to specify a length of a following data section if it can contain data of variable length, and a data section that can be compressed in a manner unique to a data type.

According to another aspect of the presently described embodiments, the system is caused to give highest priority level to the identified data packets meeting the minimum reporting interval requirement and giving remaining space in the message to the identified data packets identified by a value optimization algorithm, the priority level assigned to each data packet type and, depending on the value optimization algorithm used, the size of the data packet.

According to another aspect of the presently described embodiments, the transmitted data packets are removed from the queue after successful transmission and returned to the queue if a transmission fails.

According to another aspect of the presently described embodiments, the system further comprises a message decoder that runs on the remote device, wherein the message decoder uses knowledge of the message structure to separate out each data packet from the transmitted message.

According to another aspect of the presently described embodiments, the minimum reporting frequency requirements for each data type are configurable.

According to another aspect of the presently described embodiments, wherein the system is caused to remove the data packets from the queue if they exceed an age threshold.

According to another aspect of the presently described embodiments, the message with the included data packets includes an initialization vector used to encrypt message contents.

According to another aspect of the presently described embodiments, the data packets have a structure for data types that are larger than a single message and contain additional fields for sub-packet number and total sub-packet count that can be used for decoding to re-assemble original data.

According to another aspect of the presently described embodiments, the system is caused to use data packet age as a factor in determining whether to include a particular data packet in a message.

According to another aspect of the presently described embodiments, a method, for managing data transmission for data generated or collected by a device and stored in data packets, comprises identifying data packets stored after a last transmission, identifying data packets of data retrieved after the last transmission, storing all identified data packets in a queue, generating a message based on priority levels assigned to each data packet type wherein the identified data packets having minimum reporting frequency requirements are given a highest priority level to be included in the message followed by the identified data packets having a set priority level to be included in the message, wherein priority levels are configurable, and transmitting the message with included data packets to a remote device.

According to another aspect of the presently described embodiments, the transmitted data packets are included in the message having a header including device-critical information and reference points for time and location and each data packet contains at least one data identification section configured such that a message decoder uses the at least one data identification section for reference when reconstructing the message contents, an optional size section configured to specify a length of a following data section if it can contain data of variable length, and a data section that can be compressed in a manner unique to a data type.

According to another aspect of the presently described embodiments, generating the message comprises giving highest priority level to the identified data packets meeting the minimum reporting interval requirement and giving remaining space in the message to the identified data packets identified by a value optimization algorithm, the priority level assigned to each data packet type and, depending on the value optimization algorithm used, the size of the data packet.

According to another aspect of the presently described embodiments, the transmitted data packets are removed from the queue after successful transmission and returned to the queue if a transmission fails.

According to another aspect of the presently described embodiments, a message decoder on the remote device uses knowledge message structure to separate out each data packet from the transmitted message.

According to another aspect of the presently described embodiments, the minimum reporting frequency requirements for each data type are configurable.

According to another aspect of the presently described embodiments, the method further comprises removing the data packets from the queue if they exceed an age threshold.

According to another aspect of the presently described embodiments, the message with the included data packets includes an initialization vector used to encrypt message contents.

According to another aspect of the presently described embodiments, the data packets have a structure for data types that are larger than a single message and contain additional fields for sub-packet number and total sub-packet count that can be used for decoding to re-assemble original data.

According to another aspect of the presently described embodiments, data packet age is used as a factor in determining whether to include a particular data packet in a message.

DETAILED DESCRIPTION

Typical IoT devices use either set message formats with designated space allocations for each data type being reported or a report-based scheme that generates a new message whenever data is available (e.g MQTT). For most connection types like BTLE, Wifi, or cellular or for devices that only generate a low number of data types, these methods are sufficiently lightweight. The implementation in the example Ocean of Things (OoT) environment, however, both increases the amount of data input and restricts the available bandwidth for output compared with these typical applications.

The presently described embodiments address these issues in the example Ocean of Things (OoT) environment, but it should be appreciated that the technique of the presently described embodiments could be used in any application that transmits data or information over a limited communication bandwidth where the data have varying levels of importance and/or persistence and the data available exceeds the available communication bandwidth.

For the Ocean of Things (OoT) floats, a large amount of multi-modal data is collected by each individual float but the satellite communication pathway extremely limits the amount of information that can be exfiltrated by the system for access by a user. That is, the float devices have sensing and processing that creates data products at rates or in amounts that are much larger or multiple times larger (e.g., one hundred times (100×), ten times (10×), five times (5×), two times (2×) or any multiple or amount larger) than allowable by the communication bandwidth or link. Also, the importance, persistence (omnipresent or sparse), and desired reporting timeliness for each data type can vary significantly by type or by end user application. Thus, the presently described embodiments provide a way to optimize the information contained within a given message transmitted in a manner that is configurable by the end user. In at least one form, the system according to the presently described embodiments allows configuration changes that can change priorities for different data packets, impose and change minimum and maximum frequencies of transmissions, change precision and other settings that change data packet size, change the timing of data processing algorithms, etc. In at least one form, a user may implement changes or configurations from a different device or location such as a cloud network or configuration, presumably after taking into account what data is being transmitted and what is being left in the queue (which is also reported to the cloud as a data packet). This configurability facilitates user discretion as to the types and priority of data to transmit from a relatively large amount of collected data while still maintaining a system with extremely limited transmission bandwidths (e.g., <10 kbytes/hour).

The presently described embodiments use a combination of a modular message structure, a priority-based message packing scheme, and a data packet queue management system to optimize the information content of each transmitted message. The modular message structure starts with a header that provides critical information and reference points for time and location. The rest of the message is composed of modular data packets, each of which has a data ID section that the message decoder uses for reference when reconstructing the message contents, an optional size section that specifies the length of the following data section if it can contain data of variable length, and a data section that can be compressed in a manner unique to that data type. The message packing scheme uses a combination of priority level and minimum reporting interval, both of which are dynamically configurable for each data packet type, to maximize the value of the information contained in the modular data packets included in each message. Finally, the data packet queues manage temporary storage of data packets that have been generated but not yet included in an outgoing message, and how those data packets are "forgotten" over time.

As will be set forth in greater detail in connection with the drawings and description herein, in at least one form of the presently described embodiments, to ensure the most valuable information gets exfiltrated during each transmission session, the floats or devices in the Ocean of Things (OoT) use a modular encoding scheme for outgoing messages that, besides a short message header, allows for any combination of data packets to be included in a given message instead of predefining sections of the message to specific data outputs. To manage which data packets to include in a message, a priority value and, optionally, a minimum reporting frequency value are assigned to each data type. During processing, each new data packet generated from recent observations is placed onto a data queue. After processing is complete, the message packing algorithm follows a multi-feature method to fill the available message space. First, the algorithm adds any data packet available on the queue whose type has a minimum reporting frequency and has a time since last data packet transmission that exceeds that minimum reporting frequency. Then, any space remaining is filled using an optimization algorithm that chooses which data packets available on the queue maximally use the space based on the priority value assigned to their data types. If message transmission fails, any data packets included in the failed message are returned to the data queue to be made available again during the next transmission cycle. Both the priority and minimum reporting frequency values for each data type can be adjusted by a remote operator after deployment if a different set of data priorities is desired.

Figure 1:
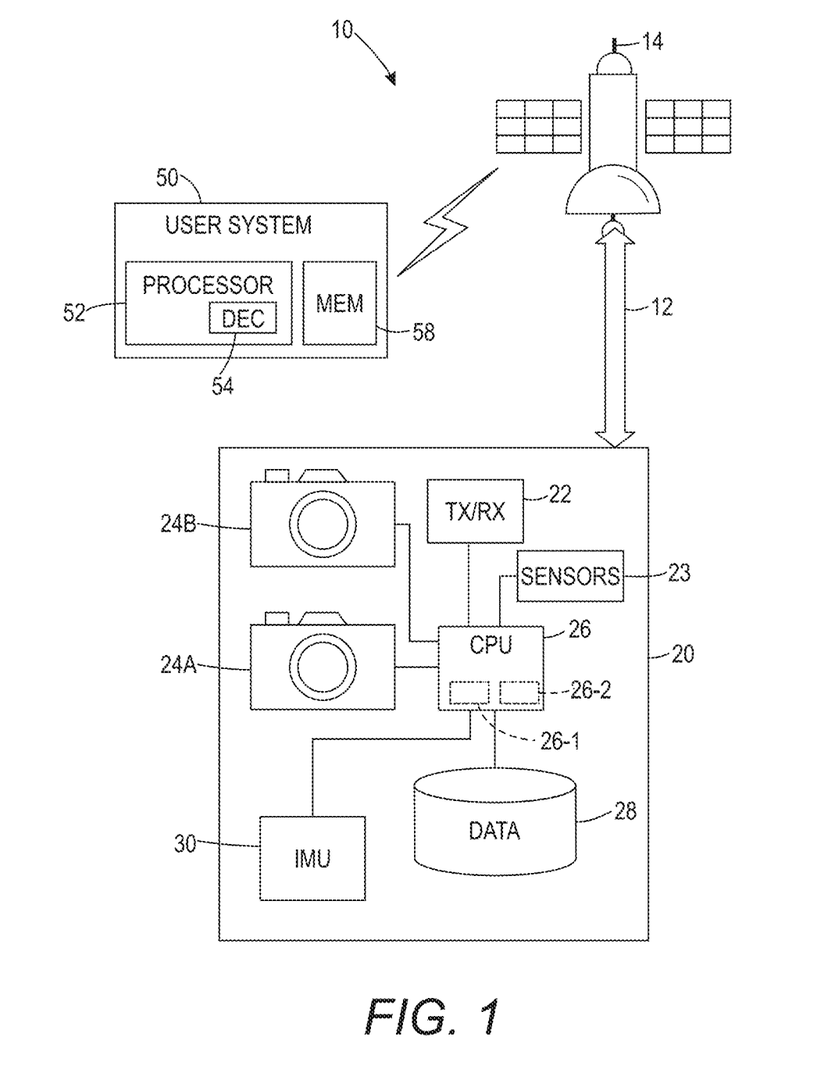
FIG. 1 is an example system into which the presently described embodiments may be incorporated.

Now, with reference to FIG. 1, there is illustrated an exemplary embodiment of a system 10 including a sensor carrying device 20 in which the presently described embodiments may be implemented. In practice, the sensor carrying device 20 is equipped and/or otherwise provisioned with a transceiver 22. Via the transceiver 22, the sensor carrying device 20 wirelessly communicates (i.e., transmits and/or receives messages, signals and/or data) over a wireless telecommunications link 12. As shown, the link 12 operatively, wirelessly connects the sensor carrying device 20 to a satellite 14 in orbit about the Earth or other planet on which the sensor carrying device 20 is situated. In practice, the satellite 14 operates to relay messages, data and/or signals between the sensor carrying device 20 and an end user device, e.g., such as a computer, server or the like located remotely away from the sensor carrying device 20, which end user device receives data originating from the sensor carrying device 20 and/or administers operation thereof. A variety of sensors, at least some of which are mentioned herein but not specifically shown, may be implemented on the device 20 and are generally represented by element 23 in FIG. 1.

As shown, the sensor carrying device or float 20 is equipped and/or otherwise provisioned with at least one camera, but in this example case, two (2) cameras 24a and 24b, e.g., digital cameras, that selectively captures images of the environment in which the sensor carrying device 20 is placed. Although two (2) cameras are shown, any number of cameras (e.g. 1, 2, 3, 4, . . . ) could be used depending on the implementation. Also, it should be appreciated that a float equipped with one or more cameras is merely an example configuration. Other sensor configurations, including configurations without a camera or cameras may be implemented. It should be appreciated that the camera(s) (if cameras are implemented) (only representatively shown for ease of illustration) will be suitably positioned on the float to achieve the objective of the implementation, e.g., to achieve suitable views in expected orientations to capture desired imaging. Suitably, the sensor carrying device or float 20 is made to be sufficiently buoyant to float on the surface of a body of water, e.g., such as an ocean, sea, lake, etc. In practice, the sensor carrying device or float 20 may be implemented as or on a buoy or the like and will be, on occasion, referred to herein as a float. It should be appreciated, however, that the presently described embodiments are most advantageously implemented in environments where small, lower-power multi-sensory floats are utilized. However, the presently described embodiments will nonetheless have advantages if implemented on traditional buoys with less power limitations.

Further, the sensor carrying device or float 20 includes an Inertial Measurement Unit (IMU) 30. The IMU 30 measures change in the pose or position of the sensor carrying device or float 20. The IMU 30 may also measure the velocity and other operational characteristics of the sensor carrying device or float 20. Such devices are well known and operate to measure and output forces, angular rates and orientation of an object. Typically, IMUs use accelerometers, gyroscopes and/or magnetometers to gather data. Here, a variety of configurations could be utilized, but in at least on form of the presently described embodiments, the IMU 30 operates in appropriate ways to utilize suitable sensors to measure and output data on, for example, pitch, roll and yaw, as well as other positional, orientational or operational data related to the sensor carrying device or float 20.

In a suitable embodiment, the sensor carrying device or float 20 is equipped and/or otherwise provisioned with a central processing unit (CPU) and/or data processor 26 and a data storage device 28. Of course, it should be appreciated that the processor 26 is provided with suitable non-transitory memory structures (not shown unless data storage 28 is used of such purposes) such as a memory or memories having stored therein code, instructions or routines that can be executed by the processor to perform functions or trigger or enable other components to perform functions. In practice, the data processor 26 controls operation of the sensor carrying device or float 20 and/or regulates operation of the various components thereof. Measurements and/or data collected, generated and/or produced by the sensors (e.g., cameras and IMU sensors) carried on the sensor carrying device or float 20, including IMU data on the pose and velocity of the sensor carrying device or float 20 generated, produced and/or output by the IMU 30 and image data generated, produced and/or output by, for example, the cameras 24a and 24b as a result of image(s) being captured thereby, are suitably stored by and/or maintained in the data storage device 28.

Additionally, the data processor 26 suitably performs image and/or other data processing on the data including image data (where applicable) as described herein. The results of such image and/or other data processing performed on the data may likewise be stored by and/or maintained in the data storage device 28. Suitably, the data storage device 28 may also store and/or maintain instructions, software, program code and/or the like which is executed by the data processor 26 to carry out the function(s) thereof and/or operation(s) performed thereby.

Further, the data processor 26 may be configured in a variety of different manners including as a system comprising multiple dedicated processor elements to perform specific functions or groups of functions. For example, in one form, more than one processor or processor element is provided. A first processor or processor element 26-1 tracks data constantly, or tracks data using dense reading techniques, for example, every two (2) to four (4) minutes. In at least one form, this processor element 26-1 operates in a low-power mode. In at least one form, it conducts less sophisticated processing (e.g., signal processing from the sensors) than the second processor. The types of tracked data from suitable on-board sensors may include, for example, atmospheric data, water data (e.g., salinity) or volatile organic compounds (voc) sensor data (related to, for example, plankton in the water). The first processor element, in one form, also controls and tracks the data generated by the IMU 30. In at least one form, the first processor, in combination with sensor devices of the system, controls data collection on the system in an amount or rate that is multiple times an amount or rate that is available for transmission using the transmission link. That is, the float devices have sensing and processing (e.g., by at least the first processor) that creates data products at rates or in amounts that are much larger or multiple times larger (e.g., one hundred times (100×), ten times (10×), five times (5×), two times (2×) or any multiple or amount larger) than allowable by the communication bandwidth or link.

A second processor or processor element 26-2 may be provided that is triggered or engaged (or "wakes up") periodically, e.g., approximately every twenty (20) minutes. In one form, this second processor element is a higher power or high compute processor or processor element than the first processor or processor element. In at least one form, it conducts more sophisticated processing (e.g., image processing, anomaly determination, data analysis, . . . etc.) than the first processer. When it wakes up, the second processor element performs suitable functions of data processing and management and may also trigger select sensors to perform, such as trigger the camera or cameras (if cameras are implemented) to capture and process images at an appropriate time, and then transfer processed and/or stored data, including the captured images, via satellite or cloud-based system. The second processor element also has access to the IMU 30 for purpose of, for example, determining the appropriate moment to capture an image. Notably, the second processor 26-2 supports and uses encryption techniques for storing data according to the presently described embodiments.

As alluded to above, it will be appreciated that the processor 26 and/or processor elements 26-1 and 26-2 (and any other processing devices implemented) will, in at least one form, use any of a variety of different memory devices (not shown except that such devices may be represented by or incorporated in memory device 28 in some examples). Such devices, for example, will take the form of non-transitory computer or machine-readable mediums having code or instruction, stored thereon, for execution by the appropriate processors to enable or cause the system to perform or function as described.

In practice, stored and/or processed data is wirelessly transmitted via the transceiver 22 from the sensor carrying device 20 over the link 12, e.g., to the satellite 14 which in turn relays the processed image data to the end user device. Suitably, the transmitted data is relayed to the end user device from the satellite 14 over a suitable telecommunications network with which the satellite 14 is in operative communication.

In practice, due to the limited resources of the satellite 14, traffic constraints on the link 12 and/or otherwise, a significantly limited bandwidth and/or data rate is established and/or imposed for the transmission of data, including image data, from the sensor carrying device 20 over the link 12. For example, the aforementioned bandwidth and/or data rate may be limited to around no more than 340 bytes per 20 minutes. Accordingly, the image and/or other data processing performed by the sensor carrying device 20 (e.g., via the data processor 26) generates and/or produces processed data such as image data which is suitably compressed to fit within a designated size, e.g., within a set limit and/or determined number of bytes or bits. In this way, the processed data can be efficiently transmitted from the sensor carrying device 20 (e.g., via the transceiver 22) over the link 12 within the allotted bandwidth and/or at the imposed data rate while maintaining a suitable amount of desired information from the corresponding data such as image data captured by the camera 24.

Also shown in FIG. 1 is a user system 50. The user system 50 may take a variety of forms and include a variety of functions, including implementation of cloud servers or cloud service. As shown, the user system 50 includes at least one processor (or processor element) 52 that has access to a memory 58. As will be appreciated by those skilled in the art, the processor 52 may execute code or instructions stored on memory 58 or on another memory unit to cause the system to function as configured. For example, the processor 52 may function as a decoder 54 upon execution of appropriate code or instructions to decode messages that may be transmitted to the user system 50 from, for example, the satellite system 14.

As noted above, the presently described embodiments use a combination of a modular message structure, a priority-based message packing scheme, and a data packet queue management system to optimize the information content of each transmitted message. In at least one form, the features of the presently described embodiments, alone or in combination, are particularly beneficial where, as in at least one example implementation, a transmission period for transmitting data between the float device and the satellite is limited to the transmission of only a single message. For ease of reference, while data packets and messages may vary in form, in at least one form according to the presently described embodiments, a "message" contains a header and one or more data packets. A "data packet" contains a unique identifier for the data type (used for decoding), potentially some additional fields used for decoding (like the number of bytes contained in the data field), and a section containing the actual data in compressed format.

Figure 2:
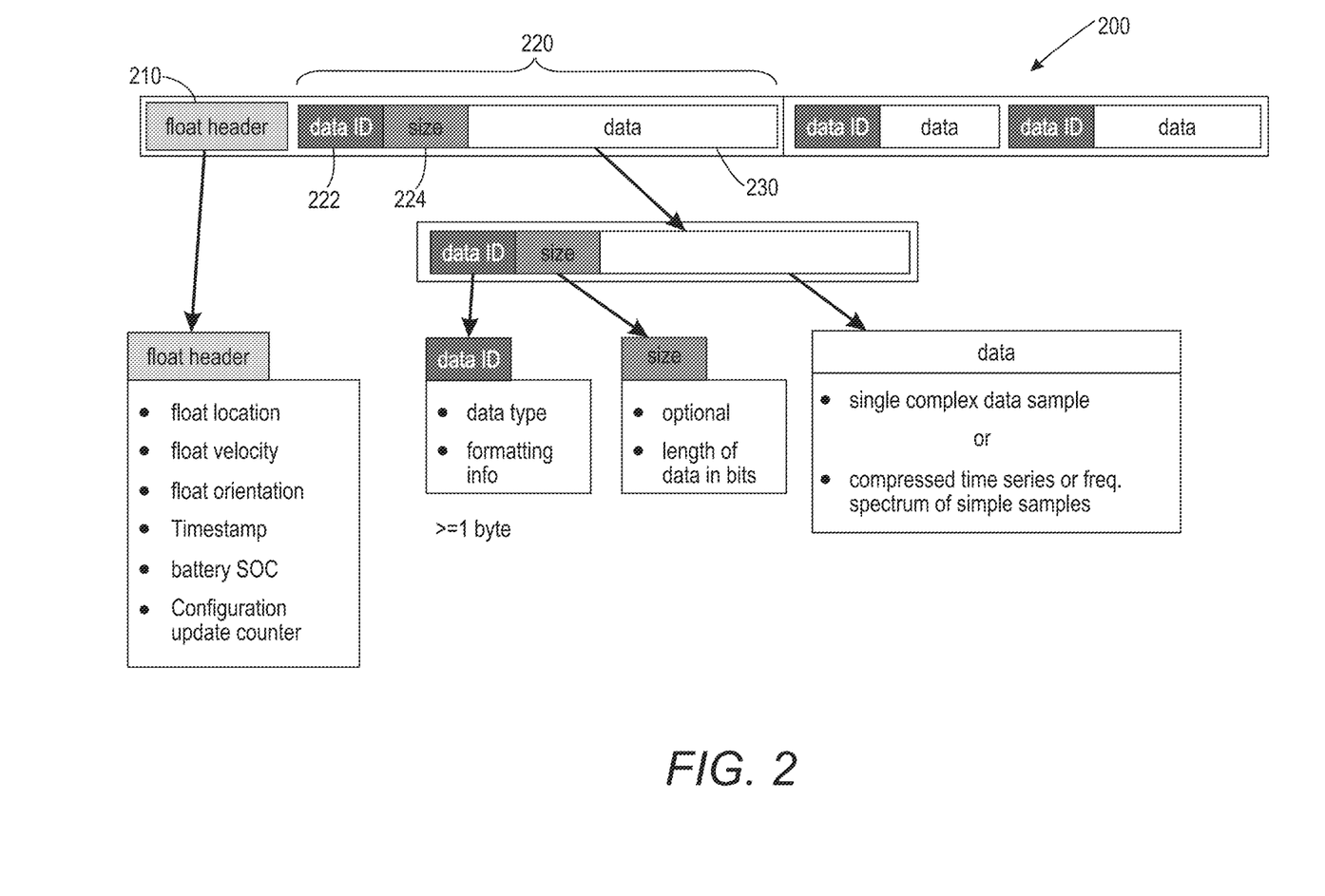
FIG. 2 illustrates the modular structure to optimize packing of different data product sizes and priorities of the message queuing and message packing scheme according to the presently described embodiments.

With reference now to FIG. 2, the modular message structure 200 starts with a header 210 that provides relevant information and reference points for time and location. The rest of the message is composed of modular data packets 220, each of which has a data identification (ID) section 222 that the message decoder uses for reference when reconstructing the message contents, an optional size section 224 that specifies the length of the following data section if it can contain data of variable length, and a data section 230 that can be compressed in a manner unique to that data type.

As shown, the header 210 of the modular message structure 200 includes information on float location, float velocity, float orientation, a timestamp, a battery state-of-charge (SOC), and a configurable updater counter. The data ID section 222 includes data type information as well as formatting information. The data ID section is typically less than or equal to 1 byte. As noted, the size section 224 is optional, but, if provided, would indicate the length of the data in bits. The data section 230 may vary in size, as noted, and may include a single complex data sample or a compressed time series or frequency spectrum of simple samples. For encryption, optionally, a portion of the message structure can be used as an initialization vector, e.g., to be used to encrypt message contents. An additional data packet structure could be used for data types that are larger than a single message (and, in at least one form, are transmitted over several transmission periods) with additional fields for sub-packet number (identifying a sub-packet and also indicating an order of sub-packets) and total sub-packet count that can be used on the decoding end to re-assemble the original data. In at least one form, accordingly, a sub-packet is a portion of an amount of a data type (e.g., a high-resolution image) transmitted using multiple messages.

Of course, it should be appreciated that the information stored in the header 210 and modular data packets 220, and the size of the data packets 220, are configurable, e.g., through use of a parameter updater. Therefore, the structure shown is merely an example. Further, it should be appreciated that such configurability could be implemented on a per message basis if desired. Also, the priority of data packets is also configurable. In at least one form, the changes in configuration of the message structure are implemented by changing or updating parameters by using satellite messages from the satellite 14 (or ultimately the user system 50) to the float device 20.

Figure 3:
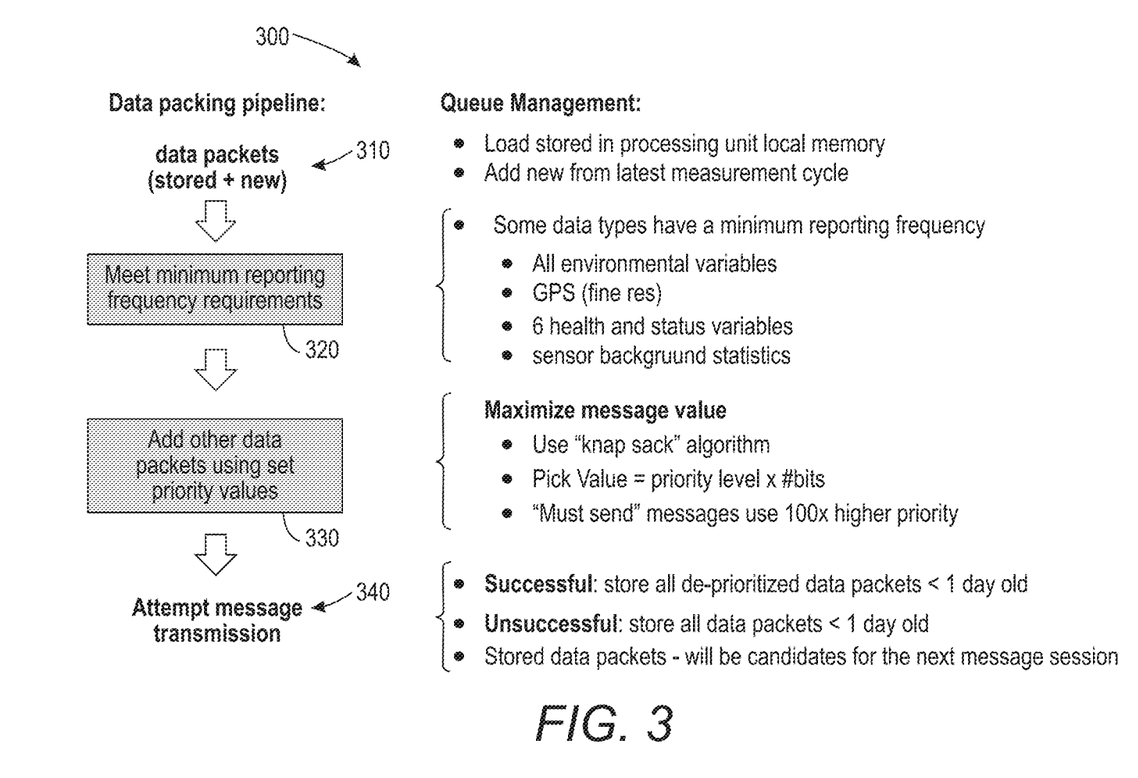
FIG. 3 illustrates the data packing pipeline and queue management of the message queuing and message packing scheme according to the presently described embodiments; and, FIG. 4 illustrates an example of the prioritizing of data packets for the message queuing and message packing scheme according to the presently described embodiments.

With reference now to FIG. 3, the message packing method or scheme 300 uses a combination of priority level and minimum reporting interval, both of which are dynamically configurable for each data packet type, to maximize the value of the information contained in the modular data packets included in each message. Available space is first filled with data meeting the minimum reporting interval requirement. Remaining space is filled using data packets identified by a value optimization algorithm, such as a knapsack algorithm, based on the priority level assigned to each data packet type and, depending on the optimization algorithm used, the size of the data packet. Finally, the data packet queues manage temporary storage of data packets that have been generated but not yet included in an outgoing message, and how those data packets are "forgotten" over time. In this regard, the data packet queue management system stores data packets as they are generated. Data packets are removed from the queue when included in a successfully transmitted message. If a message fails to transmit successfully, the data packets contained in that message are returned to the queue. Data packet age is used as an additional factor in determining whether or not to include a particular data packet in a message. In this regard, an additional prioritization can be added for message packing that preferentially includes data packets based on age in the queue (e.g., new packets vs old packets). Also, data packets may be removed from data queues if they exceed an age threshold.

In operation, with reference to FIG. 3, the method 300 for packing the data pipeline for transmission from the float devices, such as float device 20, to a desired remote location, such as satellite 14, via a link, such as link 12—and ultimately to an end user, e.g., via a user system 50, may be implemented, in at least one form, using the high compute processor 26-2 of the system in combination with suitable executed code or instructions associated with the float device 20, such as code or instructions stored in memory 28 or another suitable memory device or location on-board float device 20. Of course, as discussed herein, this system of hardware and software may take a variety of suitable forms and/or configurations to accommodate the design and/or requirements of the implementation.

The method 300 includes initially identifying and loading stored data packets in a local memory (or queue) and adding new data packets, e.g., data packets obtained in the more recent or lates measurement cycles for the float device system, to the local memory (or queue) (at 310). It should be appreciated that the local memory or queue may take a variety of forms. However, in one form, the local memory of queue is a partition or portion of the memory 28 or another suitable memory device or location that is on-board the float device 20.

Next, a message is generated based on priority level assigned to data packet types wherein the data packets given the highest priority to be included in the message are those data packets that meet minimum reporting frequency requirements (at 320). For example, data types that have minimum reporting frequency include environmental variables (typically, all environmental variables), global positioning system (GPS) data (typically, fine resolution GPS data), health and status variables (e.g., there are six (6) typical health and status variables) and sensor background statistics.

Then, data packets that have set priority values are determined to be included in the message (at 330). In this regard, in at least one form, as noted, a knapsack algorithm may be implemented where priority (weight) and cost (value) are variables. Of course, other variables, such as age of data, may be used for different, improved, or optimized implementations. In at least one form, the packet value equals the priority level multiplied by the number of bits (i.e., packet value=priority level×#bits). The priority levels may be configured or implemented in a variety of manners; however, in at least one form, very high priority (e.g., including "must send" messages) packets could be designated with a priority level that is 100 times (100×) the value of other priority levels that have less importance or immediacy.

Further, in at least one form, the system is caused to give highest priority level to the identified data packets meeting the minimum reporting interval requirement and giving remaining space in the message to the identified data packets identified by a value optimization algorithm, the priority level assigned to each data packet type and, in some forms, depending on the value optimization algorithm used, the size of the data packet.

Once the data packets are assigned to and/or included in the message, the message is sent or transmitted over the link 12 to the satellite 14 (at 340). If the transmission of the prioritized data packets is successful, the packets that were not prioritized for this transmission (e.g., de-prioritized), are stored back in the local memory. In at least one form, the data that is stored can be limited to a desired time frame of retrieval or age. For example, the system may be configured to only store de-prioritize data that is less than one day old. If the transmission is not successful, in at least one form, the system will store all data for future transmission or re-transmission. In this regard, the system could be further configured to only store all data according to a time of retrieval or age, e.g., store all data that is less than one day old. In at least one form, the stored data packets will be candidates for the next message transmission session. Also, in at least one form, there may be data packets available for transmission but are not transmitted (even if they could be transmitted on available link bandwidth or resources) because the system does not prioritize these data packet types for transmission at that time. Such data packets may be stored for later transmission or possibly deleted.

It should be appreciated that the prioritized data packets that are transmitted to the remote location, e.g., satellite 14, may then be transmitted to another location for review and/or processing, e.g., user system 50. As previously noted, the user system 50 may include a message decoder 54 that runs on the device or system 50. In at least one form, the decoder 54 of the user system 50 uses knowledge of the modular message structure according to the presently described embodiments to separate out each data packet from the transmitted message. That is, the message has a header including device-critical information and reference points for time and location and each data packet contains at least one data identification section configured such that the decoder uses the at least one data identification section for reference when reconstructing the message contents, an optional size section configured to specify a length of a following data section if it can contain data of variable length, and a data section that can be compressed in a manner unique to a data type. Also, each data packet may be decompressed, if necessary, by the decoder using a decompression method determined by the ID field in the data packet. The data packets can then be conveniently reviewed and/or processed as necessary by the user system 50.

Figure 4:
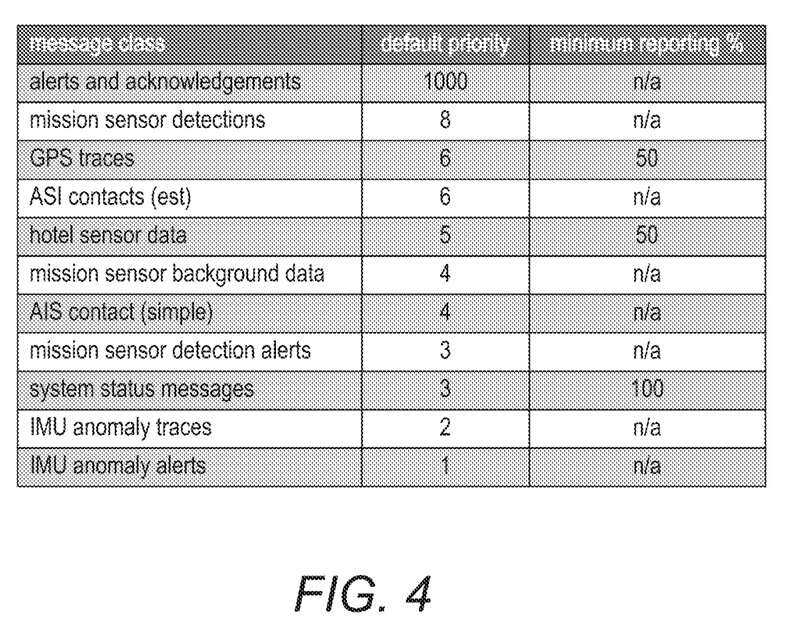

FIG. 4 relates to prioritizing the data packets. In this regard, FIG. 4 shows an example of a priority, including minimum reporting requirements.

The above methods, system, platforms, modules, processes, algorithms and/or apparatus have been described with respect to particular embodiments. It is to be appreciated, however, that modifications and/or alteration are also contemplated.

For clarity and simplicity, the present specification refers to structural and/or functional elements, relevant standards, algorithms and/or protocols, and other components, methods and/or processes that are commonly known in the art without further detailed explanation as to their configuration or operation except to the extent they have been modified or altered in accordance with and/or to accommodate the preferred and/or other embodiment(s) presented herein. Moreover, the apparatuses and methods disclosed in the present specification are described in detail by way of examples and with reference to the Figures. Unless otherwise specified, like numbers in the Figures indicate references to the same, similar or corresponding elements throughout the Figures. It will be appreciated that modifications to disclosed and described examples, arrangements, configurations, components, elements, apparatuses, methods, materials, etc. can be made and may be desired for a specific application. In this disclosure, any identification of specific materials, techniques, arrangements, etc. are either related to a specific example presented or are merely a general description of such a material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to the Figures.

It is to be appreciated that in connection with the particular exemplary embodiment(s) presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that any one or more of the particular tasks, steps, processes, methods, functions, elements and/or components described herein may suitably be implemented via hardware, software, firmware or a combination thereof. In particular, various modules, components and/or elements may be embodied by processors, electrical circuits, computers and/or other electronic data processing devices that are configured and/or otherwise provisioned to perform one or more of the tasks, steps, processes, methods and/or functions described herein. For example, a processor, computer or other electronic data processing device embodying a particular element may be provided, supplied and/or programmed with a suitable listing of code (e.g., such as source code, interpretive code, object code, directly executable code, and so forth) or other like instructions or software or firmware, such that when run and/or executed by the computer or other electronic data processing device one or more of the tasks, steps, processes, methods and/or functions described herein are completed or otherwise performed. Suitably, the listing of code or other like instructions or software or firmware is implemented as and/or recorded, stored, contained or included in and/or on a non-transitory computer and/or machine-readable storage medium or media so as to be providable to and/or executable by the computer or other electronic data processing device. For example, suitable storage mediums and/or media can include but are not limited to: floppy disks, flexible disks, hard disks, magnetic tape, or any other magnetic storage medium or media, CD-ROM, DVD, optical disks, or any other optical medium or media, a RAM, a ROM, a PROM, an EPROM, a FLASH-EPROM, or other memory or chip or cartridge, or any other tangible medium or media from which a computer or machine or electronic data processing device can read and use. In essence, as used herein, non-transitory computer-readable and/or machine-readable mediums and/or media comprise all computer-readable and/or machine-readable mediums and/or media except for a transitory, propagating signal.

Optionally, any one or more of the particular tasks, steps, processes, methods, functions, elements and/or components described herein may be implemented on and/or embodiment in one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the respective tasks, steps, processes, methods and/or functions described herein can be used.

Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to exemplary embodiments. Obviously, modifications and alterations will occur to others upon reading and understanding the present specification. It is intended that all such modifications and alterations are included herein insofar as they come within the scope of the appended claims or the equivalents thereof. It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for managing data transmission on a transmission link of limited bandwidth relative to an amount of data generated or collected and stored in data packets on the system, the system comprising:
   at least one processor including a first processor and a second processor wherein the first processor, in combination with sensor devices of the system, controls data collection on the system in an amount or rate that is multiple times an amount or rate that is available for transmission using the transmission link;
   at least one memory having stored thereon code or instructions that, when executed by the second processor, cause the system to:
   identify data packets stored after a last transmission;
   identify data packets of data collected or generated after the last transmission;
   store all identified data packets in a queue;
   generate a message based on priority levels assigned to each data packet type wherein the identified data packets having minimum reporting frequency requirements are given a highest priority level to be included in the message followed by the identified data packets having a set priority level to be included in the message, wherein the priority levels are configurable; and,
   transmit the message with included data packets to a remote device.

2. The system as set forth in claim 1 wherein transmitted data packets are included in the message having a header including device-critical information and reference points for time and location and each data packet contains at least one data identification section configured such that a message decoder uses the at least one data identification section for reference when reconstructing the message contents, an optional size section configured to specify a length of a following data section if it can contain data of variable length, and a data section that can be compressed in a manner unique to a data type.

3. The system as set forth in claim 1 wherein the system is caused to give highest priority level to the identified data packets meeting the minimum reporting interval requirement and giving remaining space in the message to the identified data packets identified by a value optimization algorithm, the priority level assigned to each data packet type and, depending on the value optimization algorithm used, the size of the data packet.

4. The system as set forth in claim 1 wherein transmitted data packets are removed from the queue after successful transmission and returned to the queue if a transmission fails.

5. The system as set forth in claim 1 further comprising a message decoder that runs on the remote device, wherein the message decoder uses knowledge of the message structure to separate out each data packet from the transmitted message.

6. The system as set forth in claim 1 wherein the minimum reporting frequency requirements for each data type are configurable.

7. The system as set forth in claim 1 wherein the system is caused to remove the data packets from the queue if they exceed an age threshold.

8. The system as set forth in claim 1 wherein the message with the included data packets includes an initialization vector used to encrypt message contents.

9. The system as set forth in claim 1 wherein the data packets have a structure for data types that are larger than a single message and contain additional fields for sub-packet number and total sub-packet count that can be used for decoding to re-assemble original data.

10. The system as set forth in claim 1 wherein the system is caused to use data packet age as a factor in determining whether to include a particular data packet in a message.

11. A method for managing data transmission for data generated or collected by a device and stored in data packets, the method comprising:
   controlling data collection in an amount or rate that is multiple times an amount or rate that is available for transmission using a transmission link;
   identifying data packets stored after a last transmission;
   identifying data packets of data retrieved after the last transmission;
   storing all identified data packets in a queue;
   generating a message based on priority levels assigned to each data packet type wherein the identified data packets having minimum reporting frequency requirements are given a highest priority level to be included in the message followed by the identified data packets having a set priority level to be included in the message, wherein priority levels are configurable; and,
   transmitting the message with included data packets to a remote device.

12. The method as set forth in claim 11 wherein transmitted data packets are included in the message having a header including device-critical information and reference points for time and location and each data packet contains at least one data identification section configured such that a message decoder uses the at least one data identification section for reference when reconstructing the message contents, an optional size section configured to specify a length of a following data section if it can contain data of variable length, and a data section that can be compressed in a manner unique to a data type.

13. The method as set forth in claim 11 wherein generating the message comprises giving highest priority level to the identified data packets meeting the minimum reporting interval requirement and giving remaining space in the message to the identified data packets identified by a value optimization algorithm, the priority level assigned to each data packet type and, depending on the value optimization algorithm used, the size of the data packet.

14. The method as set forth in claim 11 wherein transmitted data packets are removed from the queue after successful transmission and returned to the queue if a transmission fails.

15. The method as set forth in claim 11 wherein a message decoder on the remote device uses knowledge message structure to separate out each data packet from the transmitted message.

16. The method as set forth in claim 11 wherein the minimum reporting frequency requirements for each data type are configurable.

17. The method as set forth in claim 11 further comprising removing the data packets from the queue if they exceed an age threshold.

18. The method as set forth in claim 11 wherein the message with the included data packets includes an initialization vector used to encrypt message contents.

19. The method as set forth in claim 11 wherein the data packets have a structure for data types that are larger than a single message and contain additional fields for sub-packet number and total sub-packet count that can be used for decoding to re-assemble original data.

20. The method as set forth in claim 11 wherein data packet age is used as a factor in determining whether to include a particular data packet in a message.

21. A system for managing data transmission on a transmission link of limited bandwidth relative to an amount of data generated or collected and stored in data packets on the system, the system comprising:
at least one processor including a first processor and a second processor wherein the first processor, in combination with sensor devices of the system, controls data collection on the system in an amount or rate that is multiple times an amount or rate that is available for transmission using the transmission link;
wherein the first processor is configured to track data constantly or track data using dense reading techniques;
at least one memory having stored thereon code or instructions that, when executed by the second processor, cause the system to:
identify data packets stored after a last transmission;
identify data packets of data collected or generated after the last transmission;
store all identified data packets in a queue;
generate a message based on priority levels assigned to each data packet type wherein the identified data packets having minimum reporting frequency requirements are given a highest priority level to be included in the message followed by the identified data packets having a set priority level to be included in the message, wherein the priority levels are configurable; and,
transmit the message with included data packets to a remote device.

22. The system as set forth in claim 21 wherein the second processor is further configured to engage periodically.

23. The system as set forth in claim 21 wherein the second processor is further configured to determine the appropriate moment to capture sensor data.

24. The system as set forth in claim 21 wherein the second processor is further configured to generate processed data which is suitably compressed to fit within a designated size.

* * * * *